(12) United States Patent
Grossman et al.

(10) Patent No.: US 9,597,765 B2
(45) Date of Patent: Mar. 21, 2017

(54) FIBER OPTIC DIELECTRIC WAVEGUIDE STRUCTURE FOR MODAL MULTIPLEXED COMMUNICATION AND METHOD OF MANUFACTURE

(71) Applicant: Sparton DeLeon Springs, LLC, DeLeon Springs, FL (US)

(72) Inventors: Barry G Grossman, Palm Bay, FL (US); Brian A Lail, Melbourne, FL (US); Julius Chatterjee, Melbourne, FL (US); Lendon Bendix, Melbourne, FL (US)

(73) Assignee: Sparton DeLeon Springs, LLC, DeLeon Springs, FL (US)

( * ) Notice: Subject to any disclaimer, the term of this patent is extended or adjusted under 35 U.S.C. 154(b) by 0 days.

(21) Appl. No.: 14/702,654

(22) Filed: May 1, 2015

(65) Prior Publication Data

US 2015/0316721 A1 Nov. 5, 2015

Related U.S. Application Data

(60) Provisional application No. 61/986,974, filed on May 1, 2014.

(51) Int. Cl.
| | |
|---|---|
| *G02B 6/26* | (2006.01) |
| *B24B 19/22* | (2006.01) |
| *G02B 6/42* | (2006.01) |
| *G02B 6/25* | (2006.01) |
| *B24B 9/14* | (2006.01) |

(52) U.S. Cl.
CPC ............. *B24B 19/226* (2013.01); *B24B 9/14* (2013.01); *G02B 6/25* (2013.01); *G02B 6/26* (2013.01); *G02B 6/262* (2013.01); *G02B 6/42* (2013.01); *G02B 6/4203* (2013.01)

(58) Field of Classification Search
None
See application file for complete search history.

(56) References Cited

U.S. PATENT DOCUMENTS

| 5,953,477 A | * | 9/1999 | Wach | ................. | A61B 5/14546 |
| | | | | | 385/115 |
| 6,912,345 B2 | * | 6/2005 | Dautartas | ............. | G02B 6/2552 |
| | | | | | 385/43 |
| 7,481,588 B2 | * | 1/2009 | Monte | .................. | G01C 19/722 |
| | | | | | 385/123 |
| 2003/0068149 A1 | * | 4/2003 | Dautartas | ............. | G02B 6/2552 |
| | | | | | 385/123 |

* cited by examiner

*Primary Examiner* — Sung Pak
(74) *Attorney, Agent, or Firm* — Quinn Law Group, PLLC

(57) ABSTRACT

A novel optical fiber end structure and method for creating same in which an optical fiber end structure may comprise a cylindrical wedge having a planar surface angled with respect to the longitudinal axis of the optical fiber and a flat surface that is generally perpendicular with the longitudinal axis of the optical fiber. The device and method of the invention may employ a single or plurality of mechanically polished wedges on the end or ends of an optical fiber, which may, in a best mode, be a few mode fiber. The method and device of the invention may be used to independently modulate standing waves or linearly polarized waves, or both, allowing for a modal multiplexed system. The invention radiates independent standing wave modes and/or linearly polarized modes from the dielectric waveguide structure, and may be employed in single, few mode or multimode optical fibers.

25 Claims, 9 Drawing Sheets

Optical fiber cylindrical wedge shaped to 45 degrees

Optical fiber cylindrical wedge shaped greater than 60 degrees.

Linearly Polarized modes radiated from a SMF-28E few mode fiber with the FODWWS tip.

Output beam profile of a 90 degree cleaved or polished SMF-28E fiber when excited by a 650 nm source.

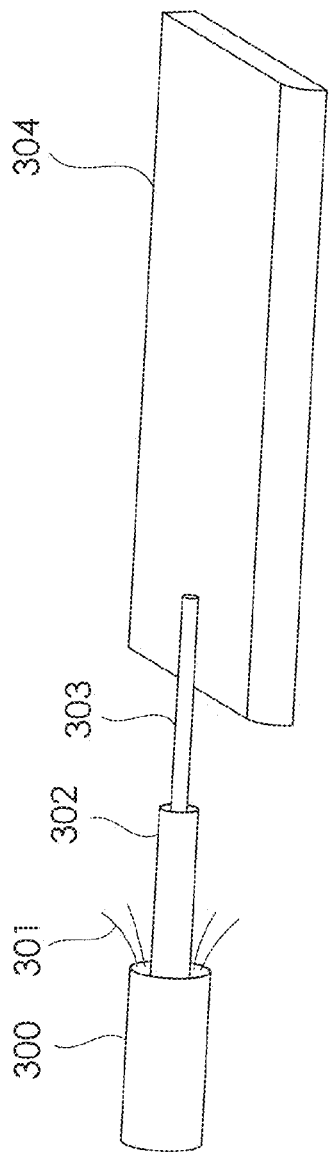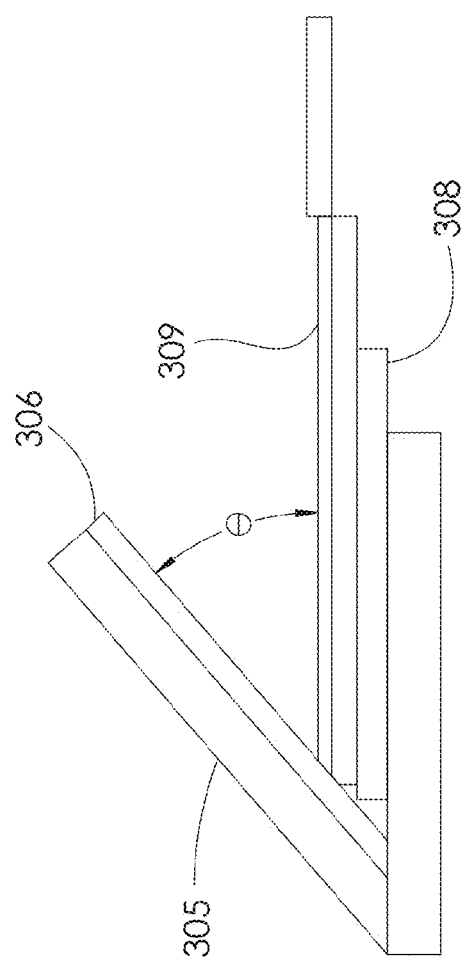

FIBER OPTIC DIELECTRIC WAVEGUIDE STRUCTURE FOR MODAL MULTIPLEXED COMMUNICATION AND METHOD OF MANUFACTURE

CROSS REFERENCE TO RELATED APPLICATIONS

This non-provisional application for patent filed in the United States Patent and Trademark Office (USPTO) under 35 U.S.C. §111(a) claims the benefit of provisional application Ser. No. 61/986,974, which was filed in the USPTO on May 1, 2014, and which is incorporated herein in its entirety by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to fiber optic modal multichannel duplex devices which may be useful, for instance, in fiber-optic communication systems and fiber optic sensing systems. More specifically, the field of the invention may be generally described as a novel method and apparatus for providing a wedge-shaped fiber optic dielectric waveguide structure for optical fiber ends for radiating and/or modulating standing waveguide modes and linearly polarized modes for use in systems in which optical fibers of any type, including but not limited to single mode, few mode and multimode fibers, are utilized to communicate information or to utilize the physical characteristics of the optical fiber to provide a number of sensing functions such as, for instance and not by way of limitation, measuring temperature by analyzing the Raman scattering of photons and other sensing applications. A novel apparatus and method for mechanically polishing optical fibers to achieve the dielectric waveguide wedge endface and lip of the invention is also disclosed and claimed.

2. Background Art

Significant research energy is being expended in field of fiber optic modal multiplexing and de-multiplexing. The typical focus of research is directed at developing an ability to communicate digital data through the dielectric waveguide. Similar focus has been directed toward the ability of the dielectric waveguide modes to respond to various sensor system stimuli. Previous work performed by Lan Truong (Florida Institute of Technology) and Sachin Narahari Dekate (Florida Institute of Technology) demonstrated that modal de-multiplexing and multiplexing is possible. However, the common processes by which the optical fiber structures are currently fabricated is hazardous, was not consistently repeatable and require significant experience to refine the process to provide a working optical fiber capable of radiating modal rings.

Previous work in the field of fabricating structures to produce radiated modal rings from optical fibers have relied upon a dangerous process using highly caustic chemicals in which hydrofluoric acid solutions are typically used to etch the tips of optical fibers into a cone shape. These chemicals require a very tight material safety data sheet (MSDS) and storage control, which can be very costly and may be prohibitive to the facilities and handling requirements. In addition to storing the chemicals, disposing of the chemicals is dangerous and costly. The use of such harsh chemicals as hydrofluoric acid makes the methods of the prior art inefficient, unreliable, hazardous and costly for mass production.

Fiber-optic communication and sensing systems are generally known in the art: such systems have been known to comprise optical fibers further comprising end shapes created by a chemical etching process, resulting in a cone shaped optical fiber tip designed to radiate modal rings from few mode fibers. Such fiber ends have historically been created by a hydrofluoric or other acid etching processes which may be characterized as non-repeatable, expensive, difficult to achieve, and utilizing a chemical process that is not friendly to the environment. Etching of an optical fiber tip creates a cone shape in which the core of the fiber is etched to a very fine point, which can be problematic. With most few mode fiber cores measuring at 8.4 microns, any vibration, sudden air currents, physical manipulation or tapping of the optical fiber can result in breakage of the fiber tip. If the tip is broken the modal ring radiation is lost. The hydrofluoric etching process cannot be expected to achieve a six sigma manufacturing process and is thus not adaptable to a production environment, or even to a laboratory environment where repeatability is important. A simpler more repeatable process is required to ensure the modal ring technology is able to transition into commercial applications for use industry.

One process for hydrofluoric acid flow etching of conical fiber tapers is described in *Hydrofluoric acid flow etching of low loss sub wavelength diameter by conical fiber tapers*, Eric J. Zhang et al., Department of Electrical and Computer Engineering and the Institute for Optical Sciences, University of Toronto, Toronto, Ontario M5S3G4, Canada ("Zhang et al."). Zhang et al. describes An etch method based on surface tension driven flows of hydrofluoric acid microdroplets for the fabrication of low-loss, subwavelength-diameter bi-conical fiber tapers is presented. Tapers with losses less than 0.1 dB/mm were demonstrated, corresponding to an order of magnitude increase in the optical transmission over previous acid-etch techniques. The etch method produces adiabatic taper transitions with minimal surface corrugations. However, it is obvious from the text of Zhang et al. that the processes described therein for chemically etching optical fibers is not mass-repeatable, economic, or environmentally friendly as is typical of the acid-based optical fiber etching processes known in the art.

What is needed in the art, therefore, is an economic, repeatable, highly reliable and environmentally friendly method and structure for creating optical fiber modal multichannel duplex devices that may be utilized to modulate an excitation source by amplitude, phase and/or frequency in single mode, few mode, and multimode fiber optic communications and sensing systems. The present invention provides such features by creating a unique wedge and lip shaped optical dielectric waveguide end face using a novel and repeatable mechanical polishing method, all of which is claimed.

BRIEF SUMMARY OF THE INVENTION

The present invention comprises a fiber optic dielectric waveguide structure and method for fabricating same that have one or more of the following features and/or steps, which alone or in any combination may comprise patentable subject matter.

In accordance with one embodiment of the present invention, the invention comprises a novel optical fiber end face structure and method for creating a novel optical fiber end face structure, wherein the optical fiber end structure comprises a planar surface disposed at an angle θ to the longitudinal axis of the optical fiber, and further may comprise a flat surface, or lip, that may be substantially perpendicular with the longitudinal axis of the optical fiber as shown and described in further detail in the figures of the drawings and in the detailed description of the invention herein. The method and device of the invention employs a single or plurality of mechanically polished wedges on the end or ends of an optical fiber, which may be, but is not necessarily, a few mode fiber. "Few mode fiber" as used herein refers to an optical fiber that supports only a few modes, for example less than four, and is capable of low dispersion operation such as, for example, a total dispersion of less than 5 ps/km-nm. Such a fiber is described in U.S. Pat. No. 4,877,304 to Bhagavatula, issued from the USPTO on Oct. 31, 1989, which is herein incorporated by reference in its entirety. The method and device of the invention may modulate and radiate standing waveguide modes and linearly polarized modes of optical fibers, which may be few mode optical fibers, or may be multimode or single mode optical fibers.

The inventors of the present invention performed modeling and experimentation directed to the modal energy of propagating light in optical fibers, including few mode fibers, with mechanically polished Fiber Optic Dielectric Waveguide Structure (FODWWS) end faces, as a method of measuring modal energy in a fiber. It was discovered that the only way to achieve a consistent and repeatable measurement of the simulation is to create a device that not only radiates the linearly polarized modes of cylindrical optical fiber wave guides, but also allows for the resonant or standing wave guided modes to be simultaneously measured. Linearly polarized optical fiber wave guide modes are developed by hybrid degenerative modes. It was discovered that both a combined cylindrical and slab waveguide combination were required in order to radiate the desired modal content.

In one embodiment, the invention is a method of implementing the Fiber Optic Dielectric Waveguide Wedge Structure (FODWWS) that both modulates and demodulates standing wave modes and linearly polarized modes and is hence an improved modal multiplexing and de-multiplexing structure and method. The same system can be used for either modal multiplexed communication, or sensing, or both. Specific modulation capabilities of the system include amplitude and phase modulation methods. Frequency modulation is possible by wavelength variations of the excitation source. The unique and innovative application of the FODWWS will provide a safer method of creating a communications or sensing system which uses modal multiplexing. The FODWWS of the invention does not utilize the use of caustic chemicals, such as for example hydrofluoric acid solutions, for etching the fiber, and is therefore significantly more reliable and repeatable for mass production than the methods and structures of the prior art, which relied upon the use of caustic chemicals.

Although the exemplary embodiments depicted herein use the few mode fiber as the example for this invention, it the scope of the invention includes other fiber optic waveguides such as multimode fibers and single mode fibers, and all such other embodiments are to be considered within the scope of the claimed invention. The combined truncated cylindrical wedge of the invention is typically created by using a length of optical fiber and mechanically polishing the end of the fiber into an angle θ between 5 and 89 degrees relative to the longitudinal axis of the optical fiber. This process creates an optical fiber tip in the shape of a truncated cylindrical wedge that comprises a planar surface that is disposed at an angle to the longitudinal axis of the optical fiber, and a planar lip surface disposed at a desired angle to the longitudinal axis of the optical fiber but is preferably perpendicular to the longitudinal axis. The lip height may be any predetermined height but is preferably greater than the cladding thickness. Unlike the polishing processes of the prior art, this process allows laser energy to radiate below the curved part of the FODWWS. An additional very unique polishing tip shape is the FODWWS with a small unpolished and flat end, or lip, that may be substantially perpendicular to the longitudinal axis of the optical fiber. This lip allows for the de-multiplexing of linear polarized modes. This enables improved modal multiplexing and de-multiplexing systems in which the FODWWS of the invention may be used as both a transmitting and receiving structure.

The present invention is further novel in that it is predicated on the linearly polarized and standing waveguide modes established by the FODWWS. Unlike other work conducted in the field, this invention does not simplify the linear polarized field equations to a set of four differential equations. This invention includes the z direction or axial field equations of the cylindrical waveguide structure. This is required based on the internal reflections of both the core/cladding interface and the source/receiver axial ends of the few mode fiber. Linearly polarized modes are created by the very small difference between the core cladding indices. This small indices difference allows for the existence of allowed hybrid Electric Magnetic field (EH) and the Magnetic Electric fields (HE) to propagate simultaneously.

Modal multiplexing and de-multiplexing of the various embodiments of the invention are achieved by the modulation of allowed electric fields (modes) of the dielectric cylindrical waveguide to FODWWS interface. A source or input FODWWS may be utilized to create the selected modal modulation by the excitation sources. In systems of the prior art, exciting the cleaved 90 degree input of a cylindrical dielectric wave guide with multiple laser sources establishes a significant number of hybrid electric and magnetic fields from the core/cladding interface. This interface will create significant inter modal modulation as a result of the very small indices difference between the core and cladding material. This limitation of the prior art is overcome by the FODWWS of the invention so as to achieve successful modal multiplexing and de-multiplexing. As a result of the reduced presence of intermodal modulation due to the novel structure of the FODWWS of the invention, multiple channel modulation is possible in a single fiber, which is a significant advancement in the state of the art.

The FODWWS enables the optical modal multiplexer and de-multiplexer to be effective. As shown in detail herein, the FODWWS can be created reliably and repeatable without harsh chemicals and thus inherently increases the safety of fabrication of the system. Previous work in the field has demonstrated the use of hydrofluoric acid as a means of etching fiber cones.

One aspect of this invention comprises the improved modal multiplexing and de-multiplexing of a few mode fiber which is operated at a wavelength that establishes a plurality of propagating modes. This may be achieved by utilizing one or more laser sources, but preferably a plurality of laser excitation sources, to illuminate a few mode fiber comprising the FODWWS of the invention on both ends, and by utilizing at least one, but preferably a plurality, of photo detectors at the FODWWS output end of the optical fiber to receive optical energy exiting the output FODWWS. The plurality of photodetectors may be arranged in a linear array. Modal multiplexing is achieved by the use of the FODWWS. Any process that does not change the material characteristics of permittivity and permeability can be used to shape the fiber end into an FODWWS. A linear array of detectors can be created and fabricated by any number of known technologies.

The present method and device of the invention overcomes the shortcomings of the prior art by eliminating the need for expensive and environmentally problematic use of acids, such as hydrofluoric acid, to etch optical fiber ends as has been previously required in the art, and further provides significant improvement in repeatability, reliability, cost savings and reduced risk over the prior art.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 7b depicts a view of an exemplary embodiment of a base of the mechanical polishing fixture of the invention.

FIG. 7c depicts a view of an exemplary embodiment of the mechanical polishing fixture of the invention.

DETAILED DESCRIPTION OF THE INVENTION

The following documentation provides a detailed description of the invention.

Fiber optic communications systems, as well as fiber optic sensor systems, generally rely upon the propagation of light along a longitudinal axis of an optical fiber. It is generally the point of such communications and/or sensor systems to modulate the propagated light in response to an external stimulus which may be, for instance, environmental conditions such as pressure or temperature, or may be an information system transmitting, for example, digital, analog or some other form of information. The means for coupling light energy into and out of an optical fiber at the fiber end faces is a critical element of any such communication or sensor system. The efficient and controllable coupling of light energy into and out of an optical fiber at the fiber interfaces may depend on a number of factors including the quality of the end face surface in terms of surface irregularities in relationship to the wavelengths of light energy present in the fiber, the angle, if any, of the fiber end face compared to the longitudinal axis of the fiber, and the difference in index of refraction between the core and cladding of the optical fiber and the medium with which it interfaces. In many instances, this interface is air.

One aspect of this invention is the implementation of the FODWWS into an advanced modal multiplexing and de-multiplexing system. The invention creates a method by which modal multiplexing and de-multiplexing is possible without the use of harsh chemicals such as hydrofluoric acid.

Figure 1A:
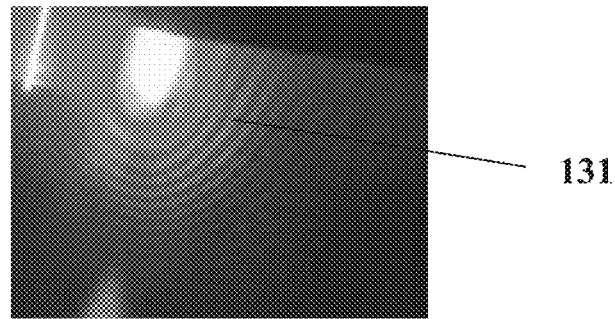
FIG. 1A depicts standing wave energy as radiated from a FODWWS of the invention comprising a few mode fiber with wedge angle θ of 45 degrees.
Figure 1B:
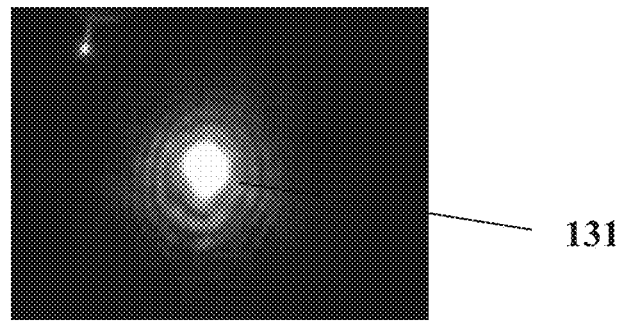
FIG. 1B depicts standing wave energy as radiated from a FODWWS of the invention comprising a few mode fiber with wedge angle θ of greater than 60 degrees.

In one aspect of the invention, optical energy such as that produced by a laser excites the source, or input, end FODWWS of the fiber, excites certain modes in the fiber. The excited modes propagate the length of the fiber, and are in turn radiated as both standing and linearly polarized modes from the FODWWS comprising the output side of the fiber. FIGS. 1A and 1B demonstrate the radiated energy from the lower surface of the SMF-28E FODWWS. Depending on the angle of the polished FODWWS, the radiated energy may establish modal semicircle rings 131 such as, for example, those depicted in FIG. 1A in which the FODWWS has been polished to a 45 degree angle θ as one of many embodiments of the invention. If the FODWWS is polished to a shallower angle, such as, for example, 60 degrees, the various standing wave modes 131 radiated from the FODWWS are shown in FIG. 1B.

Relative to the previous methods of etching the few mode fibers into conical points with hydrofluoric acid which is highly corrosive, the polishing of the fiber into the FODWWS shape using the method and apparatus of the invention can be achieved reliably, repeatedly and with reduced cost. Mass production of FODWWS systems, each of which exhibit increased information bandwidth due to modal multiplexing, is now possible using the method and apparatus of the invention: and, because the method of manufacturing the FODWWS does not rely upon dangerous chemicals, there are significantly fewer safety concerns for technicians and for the environment.

Many methods of exciting the few mode fiber standing waves within a FODWWS are possible. In the exemplary demonstration depicted in FIGS. 1A and 1B, the SMF-28E fiber was excited by a 1.2 milliwatt 650 nm continuous wave laser source. The energy was coupled into the fiber by a standard FIS connector. These connectors are well known in the art. Another method of excitation of the FODWWS is to focused radiated optical energy at the bottom of the FODWWS. In this application the few mode fiber may have a FODWWS on both ends of the fiber. One end is excited by the focused energy at a specific point on the lower side of the FODWWS so as to excite the specific electric fields in the fiber optic wave guide. Each mode is an allowed sustained electric field within the cylindrical wave guide structure. It is the cylindrical wave guide to FODWWS structure that supports the ability to excite individual modes. By exciting a number of points of the FODWWS simultaneously, each mode can be an individually modulated communications channel, allowing for multi modal communication in a single optical fiber, each channel supported by one of the excited optical modes.

Figure 2:
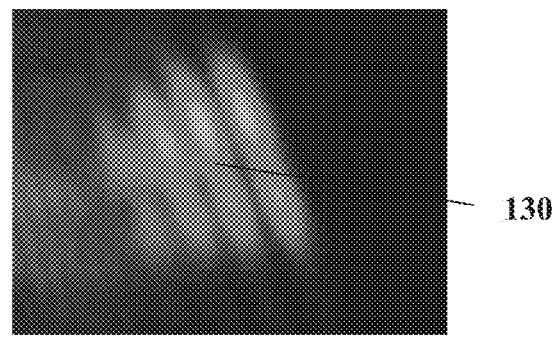
FIG. 2 depicts linearly polarized modes radiated from a FODWWS of the invention, in which the optical fiber is SMF-28E few mode fiber manufactured by Corning® Incorporated, One Riverfront Plaza, Corning, N.Y. 14831 USA.

Linearly Polarized (LP) or hybrid modes are also capable of being modulated by an excitation source radiating into a few mode fiber comprising an FODWWS structure on its input end. Linearly polarized modes are modulated in the same manner as standing wave guide modes. A small section of the FODWWS lower surface is present on the cladding thus forming a lip. This focuses the energy into the LP modes of the cylindrical waveguide. FIG. 2 depicts the same SMF-28E few mode fiber as FIGS. 1A and 1B, with the FODWWS acting as a receiver structure excited by the 650 nanometer laser. The radiated energy from the cylindrical waveguide with a polished FODWWS output end is depicted in FIG. 2 as four linear polarized modes 130 with variations in intensity, length and thickness. The normalized frequency, or V number, supports the number of observed radiated linear polarized modes 130. The optical fiber may be treated as a dielectric waveguide that may support propagation of many modes of light energy, wherein the optical fiber comprises a core having a first index of refraction $n_1$, and a cladding having a second index of refraction $n_2$. For a particular mode, the propagating optical wave is effectively confined within the optical fiber, or waveguide, and the electric field distribution in the X direction does not change as the wave propagates in the Z, or longitudinal, direction.

Although the examples presented herein uses a few mode fiber, this is exemplary only and the invention may comprise other fiber optic waveguides such as multi-mode or single mode fiber.

Figure 3:
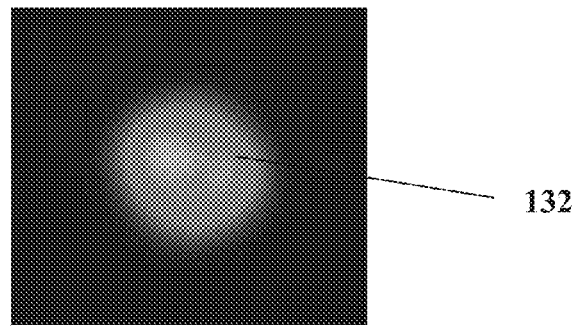
FIG. 3 depicts an exemplary output beam profile of a 90 degree cleaved or polished SMF-28E fiber when excited by a 650 nm source.

As a reference, and to illustrate that the systems of the prior art do not support modal multiplexing, a standard 90 degree cleaved angle or polished optical fiber surface of the prior art may radiate output energy as depicted in FIG. 3. FIG. 3 depicts radiated energy 132 from a length of SMF-28E fiber that has merely been cleaved and polished to 90 degrees as is done in the prior art. FIG. 3 clearly shows that the optical energy radiating from the cleaved 90 degree end face of the SMF-28E fiber end face, typical of the prior art, which is excited by a 650 nanometer source, is not separated into independently identifiable modes. For an optical system to function as a communications method employing modal multiplexing, the system must have the ability to separate and demodulate the individual modes. FIG. 3 demonstrates that the 90 degree cleaved or polished fiber end faces of the prior art clearly do not allow for the radiation of individually identifiable modes, either standing wave or linearly polarized, and thus modal multiplexing is not possible with the 90 degree cleaved or polished fiber end faces of the prior art. In order to achieve modal multiplexing, the FODWWS of the invention is needed.

Three basic types of modulation are possible in this invention: frequency modulation, amplitude modulation, and phase modulation. Depending on the modulation method used for exciting the individual modes of the fiber by the FODWWS, intelligence will be excited onto the guided modes. The invention is capable of multiple channel simultaneous digital communications. Modulating individual modes with simultaneous sources will create some intermodal modulation. A method used in this invention includes the implementation of a plurality of forward error correction techniques. These techniques will reduce the data error rate caused by intermodal modulation and self-generated noise.

Forward error correction (FEC) is often achieved by standard algorithms familiar to those in the art. Most fiber optic communication systems do not require FEC techniques since the pulses are typically enhanced by such components as erbium doped amplifiers. Pulses are reconstructed at points where the pulse dispersion or a loss of energy might take place. For those familiar with the normal VHF and UHF phase modulation radios, FEC is used extensively for reconstruction of digital data which is typical lost from over the air radiation. Data may be lost by noise, phase modulation, cross talk and other issues which might reduce the signal integrity. In this particular application of the invention, noise from phase variations might create some modal cross talk that would be expected to degrade the ability to decode intelligence on a carrier or mode. FEC coding can be used to overcome the inter-modal crosstalk effect of the invention.

Modes are developed in a cylindrical waveguide as function of fiber optic core size and source wave length. Multiple excitation sources at different angles has been demonstrated by Mushed et al. to excite skew modes in the fiber by the angle at which the laser enters the core. Murshid et al. also defines the method of excitation as skew modes in multimode fibers. As opposed to the work of Murshid et al., This invention excites individual modes of a dielectric waveguide as an implementation of Maxwell's equations with defined boundary conditions. Skew mode high frequency analysis cannot define the dielectric wave guide response to refraction and phase variations. These allowed modes include all modes predicted by Maxwell's equations. An additional variation of the work of Murshid et al., this invention does not angle the excitation source into the 90 degree cleaved edge of a multimode fiber. This invention modulates individual modes by focusing directed energy at specific locations of the input FODWWS.

Waveguide modes are created by the allowed Eigen value, or distinct allowed electromagnetic Electric fields which will propagate in the given wave guide geometry. A 90 degree cleaved fiber can be excited by a laser source along the axis of its core. This excitation source will establish linearly polarized modes as is demonstrated in Equation (1) below. To those familiar in the art, this is the normalized frequency, commonly defined as the V number. The V number is 2.4 or less for single mode propagation. If the V number for a particular fiber and wavelength combination is between 2.4 and 12 then that fiber will operate as a few mode fiber. The famed Gloge chart is a method of accurately estimating the very complex function of linearly polarized modes. This invention decreases the source wavelength to allow for more modes to propagate in the core of the few mode fiber. Linear polarized modes are also Degenerative Hybrid modes. They are also referred to as lossy modes.

$$V=2\pi/\lambda NA \quad \text{(Equation 1)}$$

Degenerative modes are defined as a set of allowed propagating modes along the longitudinal axis of the fiber and containing the same exponential field variations. These same modes will however, have different configurations in any transverse cross section of the fiber core. As an example, the LP01 mode would consist traditionally of 2 HE11 modes. These two modes will have the same hybrid magnetic-electric fields along the axis, but can and will vary along the cross section or transverse part of the core. Those skilled in the art will further understand each hybrid mode can propagate along the fiber axis independently. This invention takes advantage of the cross sectional variation of the allowed fields to modulate modes propagating through a few mode fiber core. This differs from the work of Murshid et al., which does not consider reflected waves and standing waveguide modes as a method of modulating and creating modal communications multiplexing.

Conventionally the use of the normalized frequency is used as a simplification of very complex electromagnetic propagation equations. This simplification is derived from the assumptions the indices of refraction within the core and cladding interface is very small, thus only four of the six of the hybrid electromagnetic equation field components are considered. In this invention a detailed evaluation of the six allowed hybrid modes is required. This implies that the allowed Hz and Ez modes must also be considered due to the FODWWS/cylindrical waveguide interface. The core wave guide variation sets up reflected power within the cylindrical waveguide structure. For this invention, the linear polarized modes must also consider the axial Electric and Magnetic field propagation.

Referring again to the examples of the invention resulting in the patterns of FIGS. 1A and 1B, 14 semi-rings are observed in the picture radiating from the FODWWS output structure. These are the allowed standing wave modes for a cylindrical waveguide excited by the 650 nm source. The linearly polarized modes of FIG. 2 which are defined by the normalized frequency are demonstrated. Notice that four of the allowed LP modes are the dominate modes in this particular example. Thus, 14 independent standing wave modes and 4 individual linear polarized modes are possible, for a total of 18 independent modes, each capable of supporting a separate communication or sensor information channel. In the particular case shown in FIGS. 1A and 1B, each of the 18 independent standing wave and linearly polarized modal channels may be excited by independent optical sources, such as, for example, lasers, and may be received by independent photo detectors, allowing for eighteen independent optical modal channels and creating a modal multiplexed communication or sensing system in a single fiber. This is but one example of the modal multiplexed system of the invention: the invention may comprise any number of independent optical modal channels with associated independent optical sources and photo detectors.

The input side of the system of the invention may use multiple laser sources to excite the modes in the FODWWS. It is generally not possible to excite the individual modes by an excitation source into a 90 degree cleaved fiber. Such direct axial and slightly off axial radiation creates significant intermodal modulation and distortion. In order to individually excite the allowed modes in the fiber, the FODWWS is required.

Amplitude modulation can be achieved by stimulating the allowed modes propagating along the core. The invention may establish the fundamental fields by a constant source power level. Additional variations in the core modal fields may be amplitude modulated by pulsing each mode independently by directive excitation of the input FODWWS. Phase modulation can be achieved by the pulsing of the source laser relative to a reference laser. Frequency modulation can be achieved by shifting the fundamental frequency wavelength.

The invention both transmits and receives from the FODWWS. A few mode fiber with the cylindrical wedge on the source or transmitter side may excite the fundamental modes. The invention may employ multiple source lasers FODWWS excitation to modulate defined modes. Modulated modes will propagate through the fiber to the receiving FODWWS. Energy is then radiated from the receiver end and received by a linear array of detector diodes: the linear array of this invention is simple and less complexity in that it does not require exotic patterns in order to operate.

Figure 4:
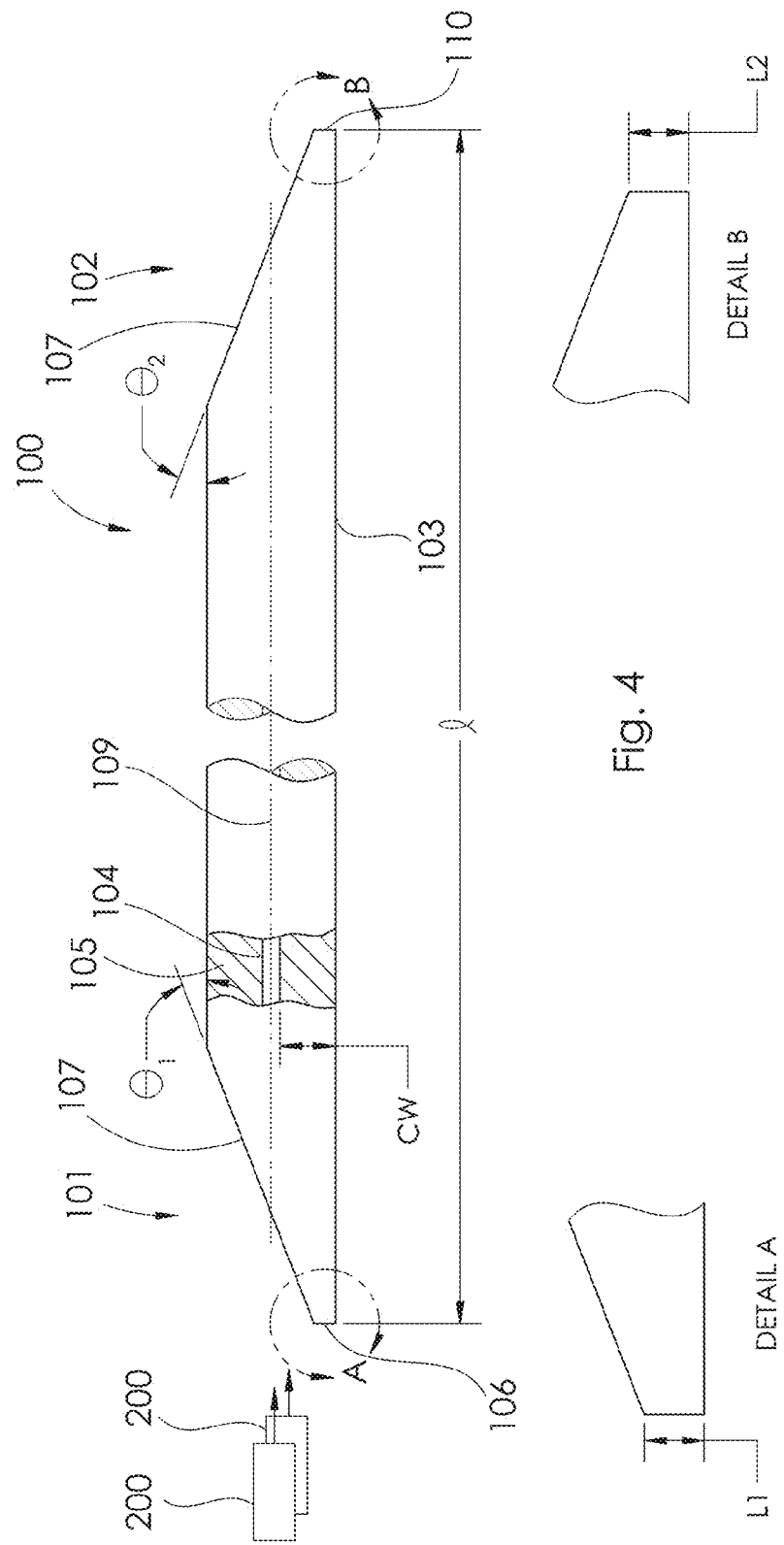
FIG. 4 depicts an exemplary block diagram of one embodiment of the system of the invention, showing laser sources illuminating an input end of a FODWWS of the invention, and also depicting optical energy radiating from the output end of a FODWWS of the invention and illuminating photodetectors, which may be photodiodes. The FODWWS truncated cylindrical wedge structure, including the planar surface, which is disposed at an angle to the longitudinal axis of the optical fiber, and the lip surface are depicted.

FIG. 4 depicts an embodiment of the invention comprising an optical fiber 103, which may be a few mode fiber, single mode fiber, or multimode fiber: an input FODWWS truncated cylindrical wedge structure 101 and an output FODWWS truncated cylindrical wedge structure 102. In a typical application, the optical fiber may be defined as having a first end a second end, a core 104, and a cladding 105 wherein core 104 and cladding 105 are cylindrically shaped and coaxially disposed about said longitudinal axis, and wherein core 104 is defined as having a first index of refraction n1 and cladding 105 is defined as having a second index of refraction n2, and wherein core 104 is further defined by a cross section having a radius, and wherein cladding 105 is further defined as being concentrically disposed about the core and having a cross section defined as a ring having an inner cladding radius and an outer cladding radius, where cladding thickness CW is defined as the difference between the inner cladding radius and the outer cladding radius. Input FODWWS truncated cylindrical wedge structure 101 may comprise an angled end face 107 that is a planar surface oriented at angle $\theta_1$ to the longitudinal axis 109 of optical fiber 103. Input FODWWS 101 may also comprise a lip 106 of height L1 that is preferably, but not necessarily, disposed substantially perpendicular to optical fiber longitudinal axis 109 as depicted in Detail B. Output FODWWS truncated cylindrical wedge structure 102 may comprise an angled end face 108 that is a planar surface oriented at angle $\theta_2$ to the longitudinal axis 109 of optical fiber 103. Output FODWWS truncated cylindrical wedge structure 102 may also comprise a lip 110 of height L2 that is disposed substantially perpendicular to optical fiber longitudinal axis 109 as depicted in Detail A. In an embodiment of the invention, $\theta_1$ may be equal to $\theta_2$, and height L1 may be equal to L2. In an embodiment of the invention, core index of refraction n1 may be greater than cladding index of refraction n2. Heights L1 and L2 may be any dimension but are preferably greater than the cladding thickness. Optical fiber 103 may comprise a core 104 and a cladding 105. Cladding 105 may have cladding wall thickness CW.

Still referring to FIG. 4, one or more optical excitation sources 200, which may be for example laser diodes, may be used as sources of optical energy that couple optical energy into input FODWWS 101 in order to excite standing wave modes and linearly polarized modes within fiber 103. The invention may comprise any number of optical sources 200.

Figure 10:
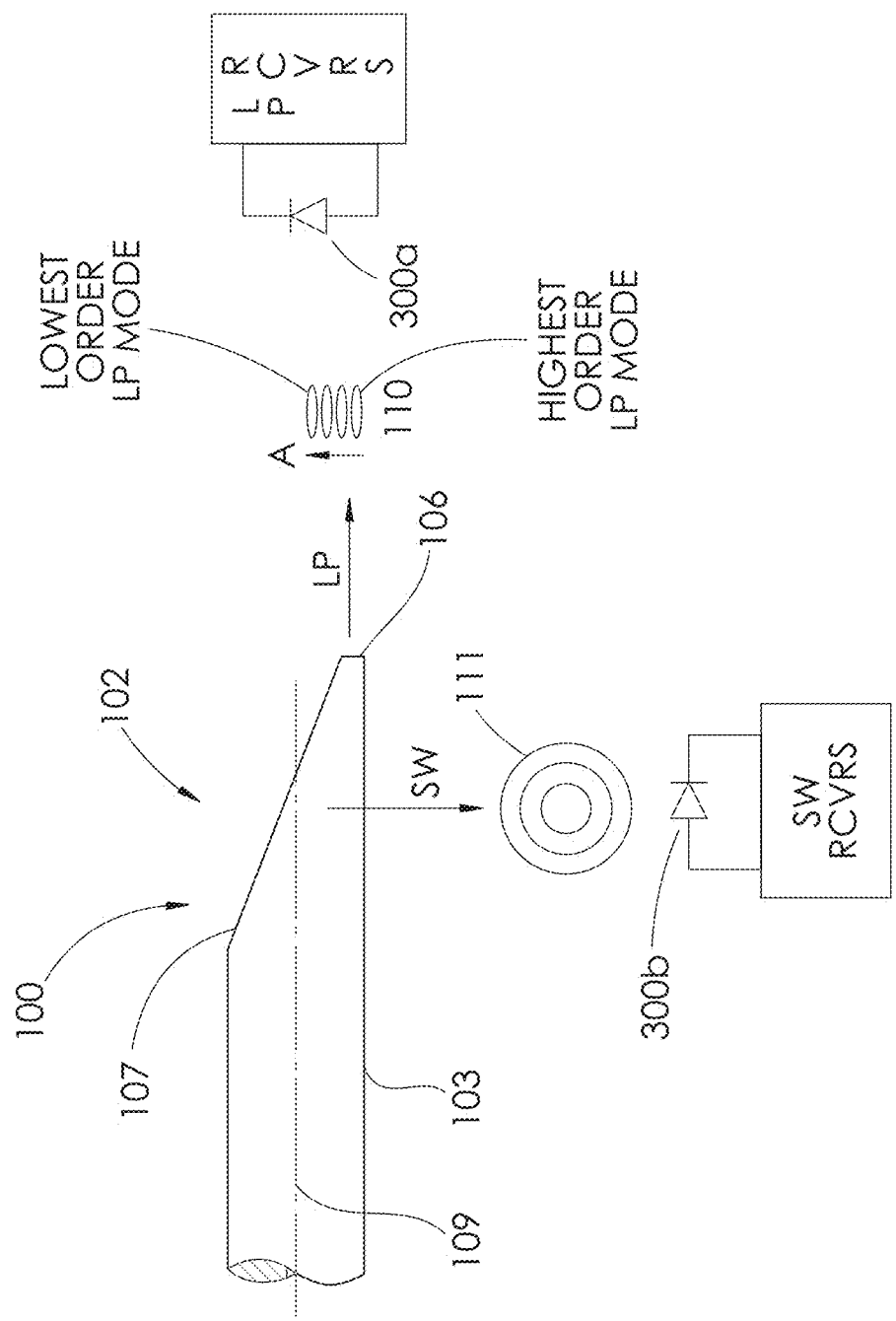
FIG. 10 depicts exemplary standing waves modes and linear polarized modes radiated from the output end of a preferred embodiment and best mode of the FODWWS.

Referring briefly now to FIG. 10, the optical energy coupled into input FODWWS 101 propagates along the length of optical fiber 103 to the output FODWWS 102, where the linear polarized modes 110 exit and radiate from output FODWWS 102 in the direction of arrow LP to illuminate photodetector array 300*a*, which may be in electrical communication with the receiver array indicated as LP RCVR. The linearly polarized modes may be spatially separated so that they may illuminate and be in optical communication with individual, specific photodetectors making up photodetector array 300*a*. The radiated linearly polarized modes 110 may be spatially separated in order from lowest to highest as shown in FIG. 10. In this manner, individually radiated linearly polarized modes may be individually detected by the individual photodetectors in array 300*a*, and each detected linearly polarized mode may be individually demodulated, and, if Forward Error Correction has been employed, decoded in the LP RCVR array. The LP RCVR array may comprise any number of independent receive and demodulation channels. Each of the detector diodes in photodetector array 300*a* may be physically disposed so as to be in optical communication with and receive a specific linearly polarized mode of optical energy 110 radiating from output FODWWS 102.

Still referring to FIG. 10, standing wave modes 111 modes exit and radiate from output FODWWS 102 in the direction of arrow SW to illuminate photodetector array 300*b*, which may be in electrical communication with the receiver array indicated as SW RCVR. The standing wave modes 111 may be spatially separated so that they may illuminate and be in optical communication with individual, specific photodetectors making up photodetector array 300*a*. The radiated standing wave modes 111 may be spatially separated in order from as shown in FIG. 10. In this manner, individually radiated standing wave modes may be individually detected by the individual photodetectors in array 300*b*, and each detected standing wave modes may be individually demodulated, and, if Forward Error Correction has been employed, decoded in the SW RCVR array. The SW RCVR array may comprise any number of independent receive and demodulation channels. Each of the detector diodes in photodetector array 300*b* may be physically disposed so as to be in optical communication with and receive a specific standing wave mode 111 of optical energy radiating from output FODWWS 102.

Referring to FIGS. 4 and 10, each of the detector diodes of arrays 300*a* and 300*b* may be physically disposed so as to be in optical communication with and receive a specific mode of optical energy radiating from output FODWWS 102. The invention may further comprise any number of detectors 300. In an optional embodiment of the invention, each radiating mode may be received by a detector disposed to receive it, so that the number of detectors 300 correlates to the number of modes radiating from output FODWWS 102. Thus, in an embodiment of the invention, the number of detectors 300 equals the number of optical excitation sources 200. The summation of the established energy from both the reflected waves at each end of the wave guide structure is maintained by the continuous source radiation energy. The amount of energy reflected in the standing wave modes may be dependent on the indices or refraction of fiber core and air interface mediums. Detector diodes may individual diodes set at a distance from the output FODWWS 102, or may alternatively be disposed in a single semiconductor structure which forms an array of photo detectors disposed such that each mode radiated from output FODWWS 102 is in optical communication with and received by at least one photodiode. In either case, the detector diode array may be linear and spaced at predetermined distances to allow for the detection of either the linear polarized modes, or the standing wave modes of the radiated energy, or both. At output FODWWS 102 of fiber 103, this variation of both the core and cladding interface with air creates an evanescent field on the surface of the cylindrical wedge. It is this field that reflects the standing wave mode energy below the cylindrical wedge wave guide structure as shown by arrow SW.

Figure 5:
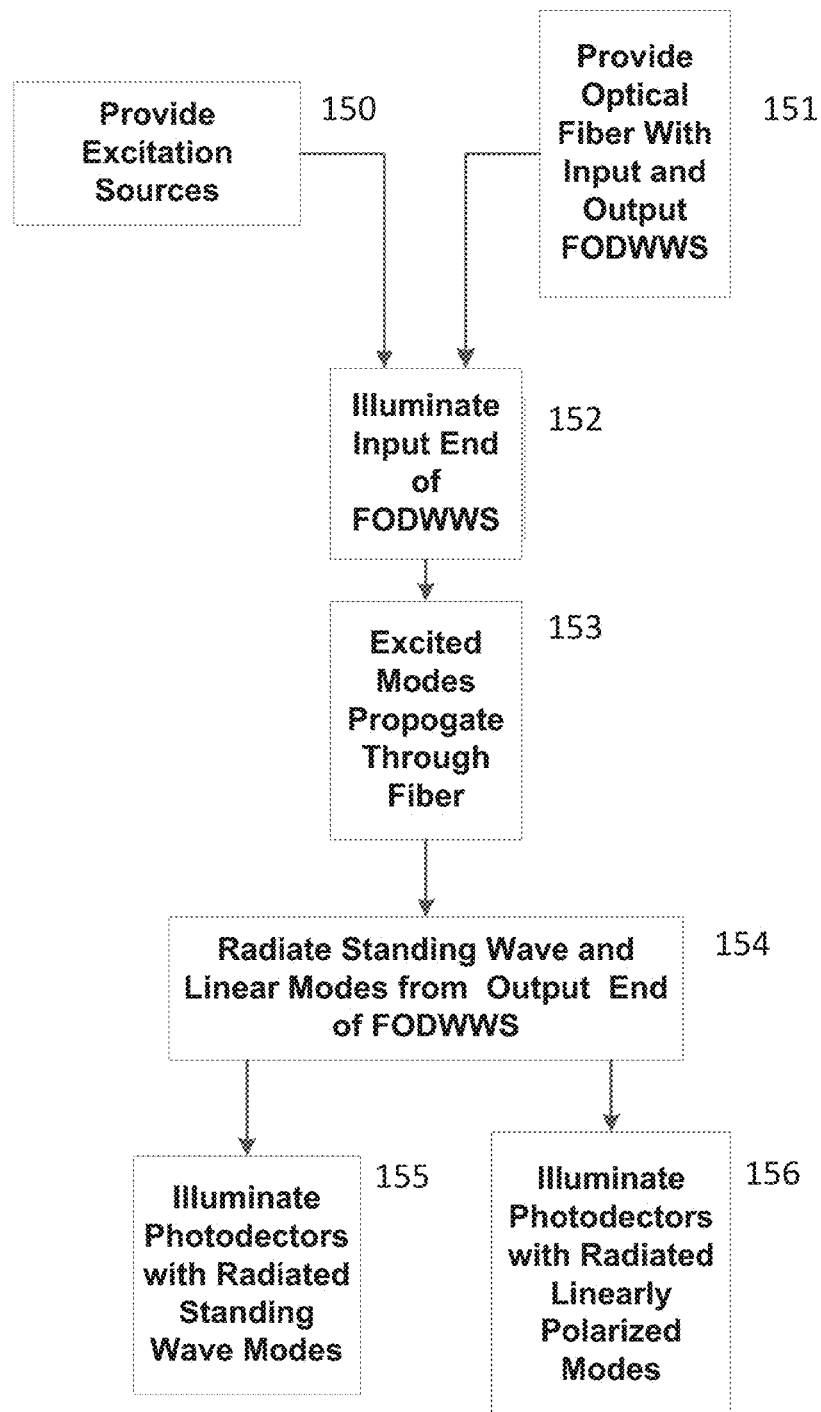
FIG. 5 depicts an exemplary system flow diagram for a system comprising laser excitation sources, an FODWWS of the invention and photodetectors.

FIG. 5 describes an exemplary method of the steps of using the FODWWS of the invention. In a first step 150, at least one optical excitation source, but preferably a plurality of optical excitation sources, is provided. In a second step 151, an optical fiber preferably comprising an input FODWWS and an output FODWWS is provided. Next, in step 152, the optical excitation sources are positioned and otherwise disposed so as to illuminate the FODWWS input end in order to couple their output optical energy into the input FODWWS, so that the optical excitation sources are in optical communication with the input FODWWS, causing standing wave optical modes, or linearly polarized optical modes, or both, to be excited in the optical fiber. The standing wave modes, or linearly polarized modes, or both, propagate the length of the fiber 153 to the output FODWWS where they are radiated from the output FODWWS 154. The radiated standing waves are received by photodetectors that are disposed to receive the radiated standing wave energy 155, and the radiated linearly polarized modes are received by photodetectors that are disposed to receive the radiated linearly polarized modes 156.

Figure 6:
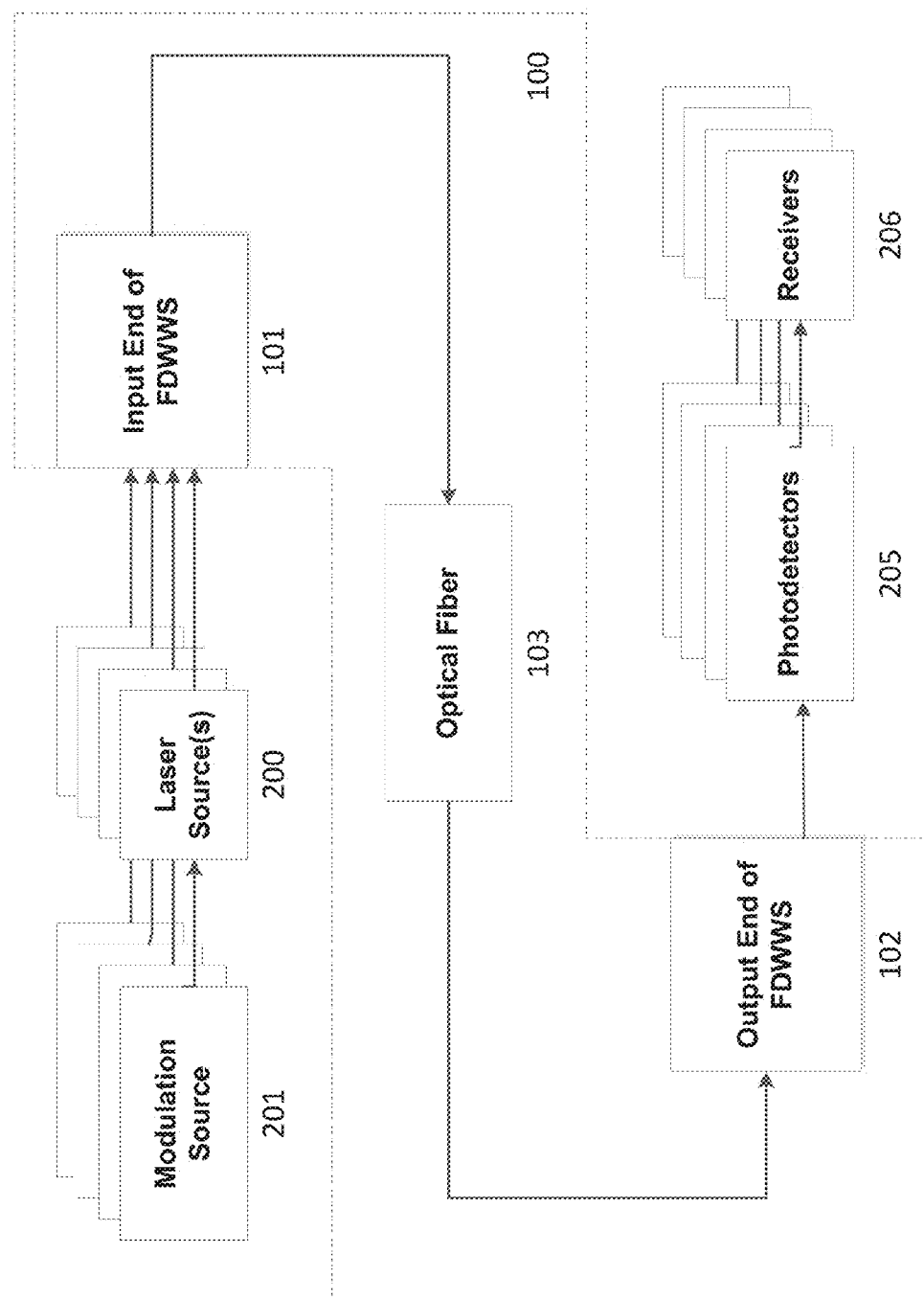
FIG. 6 depicts an exemplary system block diagram of a multimodal communication system comprising modulation source(s), laser excitation source(s), an FODWWS of the invention, photodetector(s) and receivers.

Referring now to FIG. 6, an overall system block diagram of the system of the invention system is depicted. Modulation source(s) 201 are in electrical or optical communication with at least one, but preferably a plurality, of optical excitation source(s) 200, which may be light emitting diodes, laser diodes, or any optical source capable of transmitting optical energy. Optical excitation source(s) 200 may each be in optical communication with input FODWWS 101 which is part of optical fiber 103. Output FODWWS 102, which is also part of optical fiber 103, may be in optical communication with photo detectors 205, which may be the photodetector arrays 300*a* and 300*b* shown in FIG. 10, are disposed to individually receive the individual radiated standing wave modes, radiated linearly polarized modes, or both, from output FODWWS 102. Each photodetector 205 may be in electrical communication with a receiver 206. Thus, the system of the invention may comprise a plurality of modulation sources 201, a plurality of optical excitation sources 200, a plurality of photo detectors 205, and a plurality of receivers 206, together forming a plurality of separate, independent communication channels in which each modulation source 201 is in electrical communication with a particular optical excitation source 200, and wherein each optical excitation source 200 is in optical communication with input FODWWS 101 and establishes an particular propagating optical mode in fiber 103, and wherein each particular propagating optical mode is, in turn, radiated from output FODWWS 102 to a particular detector in communication with output FODWWS 102 which is, in turn, in electrical communication with a particular receiver, all forming independent communication channels that comprise the modal modulation system of the invention.

In an alternate embodiment of the invention, Forward Error Correction (FEC) encoding may be employed by including an FEC encoder with modulation source(s) 201 and including FEC decoder with receivers 206 (and also with receivers LP RCVR and SW RCVR depicted in FIG. 10). FEC may be employed to reduce the effect of intermodal interference, or crosstalk between modes that arises from the coupling of energy into input FODWWS 101 from optical excitation sources 200, from propagation of the various modes in optical fiber 103, or from radiation of the various modes from output FODWWS 102.

The invention may use the FODWWS to both excite and receive the linearly polarized modes in the few mode fiber. Standing waves created by the receiver cylindrical wedge are also modulated by additional LASERs in this invention. This is done to simplify the process of other methods for excitation and decoupling of modal energy. This invention does not require complex interfaces as in other methods, and is ready for mass production. No harsh chemicals are used to create issues with personal or the environment. The invention is simple and straight forward as opposed to other methods of modal multiplexing and de-multiplexing.

Lasers typically may be characterized by a spot size. The spot size will vary in diameter as the distance of the laser source from the fiber being excited increases or decreases. In one embodiment, the invention may focus the energy of a second laser onto specific modes by the position in the core of a few mode fiber. With the established field and resonant modes already created, the second or plurality of lasers that will excite the modes must control excitation amplitude. Controlling the amplitude of the modal excitation lasers aids in the prevention of inter modal modulation. This invention then uses wave guide equations to define the phase, amplitude and radiation from the receiver end of the fiber. This is different from that of Murshid et al. who are exciting the source end of the fiber by angling the laser into the core to achieve a skew ray.

Skew rays are determined by high frequency techniques which make certain assumptions. The first is that the wave length of the laser source is much smaller than the core diameter. By exciting the multi-mode fiber with numerous sources and constant powers, a laser spot size will have a much higher probability of creating phase and modulation variations prior to the numerous core-cladding reflections experienced along the axial length of the multimode fiber. Linear polarized modes are simplified in the Gloge diagram by making the assumption that the radial components of the core and cladding indices are very small. These same interfaces and reflections will create inter modal interference. By conducting many interference patterns at the same wave length and amplitude, individual channels of modal modulation are significantly more complex and difficult to achieve. This invention simplifies that modulation and propagation.

Figure 7A:
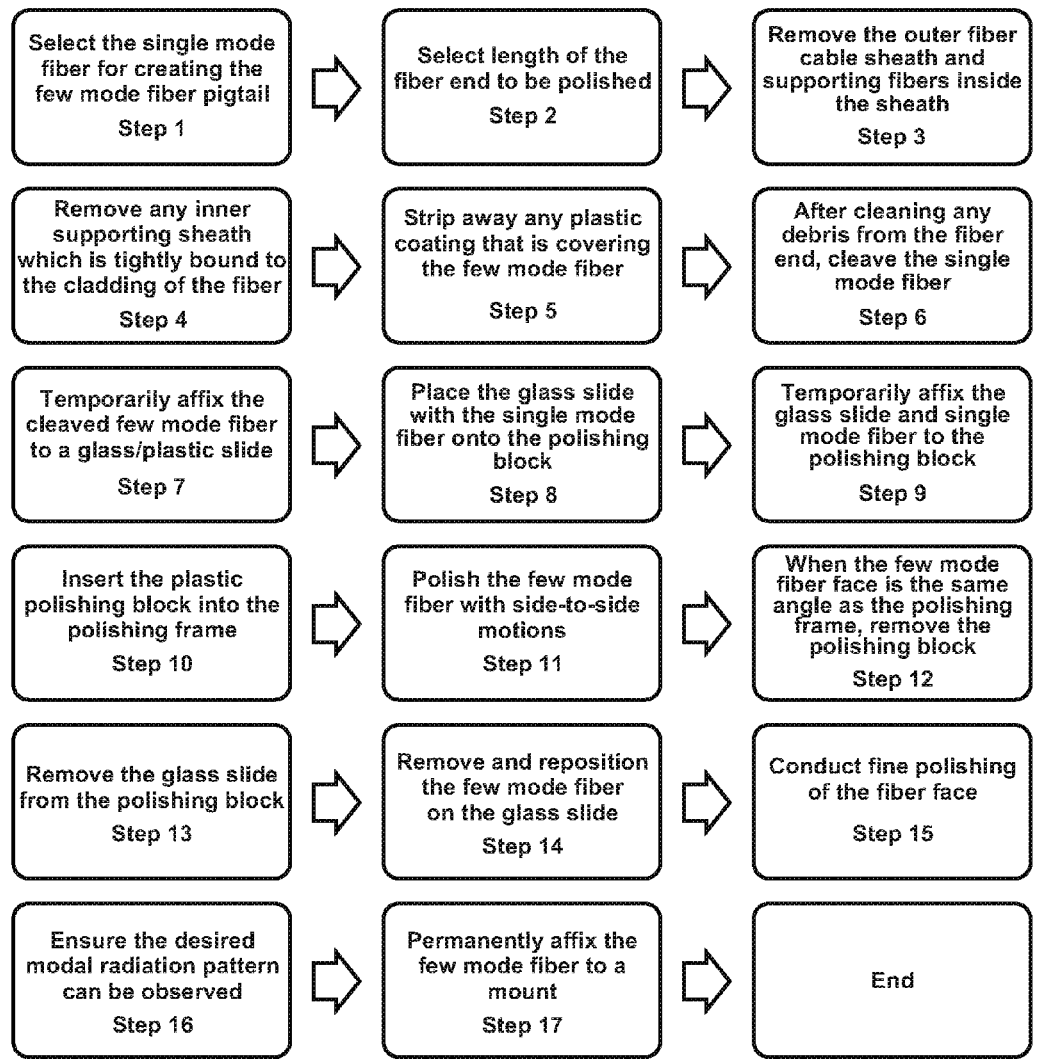
FIG. 7a depicts an exemplary embodiment of the steps of a polishing method of the invention.

An example of one embodiment of the novel method and fixtures for shaping the cylindrical wedge for this invention is provided by FIGS. 7a, 7b, and 7c. In this exemplary embodiment of a manual mechanical polishing apparatus and method of the invention, a novel method for fabrication of an FODWWS of the invention is depicted. The particular method depicted in FIGS. 7a, 7b, and 7c is exemplary. The invention includes all equivalent steps for mechanical polishing of an optical fiber that are capable of creating the FODWWS.

In the mechanical polishing methods of the invention, care must be taken to not over heat the surface of the fiber optic wedge. The method must ensure that the consistent permittivity and permeability of the cylindrical waveguide are not affected by overheating of the FODWWS planar surface (depicted as planar surfaces 107 and 108 in FIG. 4). After the FODWWS is fabricated, modulation of the data can be achieved by the addition of heat to the fiber. In this example the manual method described uses a mechanical fixture to create the desired shape. Each step of the mechanical polishing method of the invention is depicted in the flow chart of FIG. 7a. FIGS. 7b and 7c depict the mechanical polishing fixture of the invention that may be used to carry out the mechanical polishing method of the invention.

Step 1 of the mechanical polishing method of the invention is the selection of an optical fiber to be used in creating the FODWWS. The fiber may be a few mode fiber, a single mode fiber, or a multimode fiber. Typically a the optical fiber also includes other elements of a cable and therefore the fiber may also comprise an outer sheath, inner strengthening fibers, inner sheath and plastic coating on the cladding of the fiber.

Step 2 of the mechanical polishing method of the invention may be selecting the length of the optical fiber to be utilized in the modal multiplexed communication system. The length of the optical fiber is generally determined by the length optical fiber needed for a particular application. However, the length of the fiber must be long enough to reach from the optical source and onto the polishing block.

Step 3 of the mechanical polishing method of the invention is the removal of the outer sheath and inner supporting fibers just below the sheath which may cover the optical fiber. Placing the fiber onto a glass slide requires that at least twice the length of the outer sheath 300 and the reinforcing strands 301 be removed, typically by cutting. This will expose an inner sheath 302 also used to support and protect the optical fiber. This material should not be allowed to contaminate the polishing process or the face of the cylindrical wedge can become scratched.

Step 4 of the mechanical polishing method of the invention is to remove the inner sheath 302 supporting the few mode fiber. Again the length removed of the inner sheath 302 must be enough to allow the fiber to be placed onto glass slide 304. During the mechanical polishing process, the cladding and core should be flat on the surface of glass slide 304.

Step 5 of the mechanical polishing method of the invention is the removal of the plastic coating on the outside of the cladding. Those skilled in the field will remove the coating prior to cleaving the fiber. Any coating on the fiber will not allow the fiber to be properly cleaved so as to produce a planar fiber end face at 90 degree angle to the longitudinal axis of the optical fiber.

Step 6 of the mechanical polishing method of the invention is the cleaning and subsequent cleaving of the optical fiber. Prior to the mechanical polishing of optical fiber 303, the fiber is cleaved at a 90 degree angle. While cleaving by thermally heating or arching of the fiber may be used in the method of the invention, it can cause a change in the optical fiber's characteristics. Mechanical cleaving of the optical fiber 303 is the best approach. Evaluation of the cleaved end is important: the cleaved fiber end face must be a smooth surface, and no cracked or broken cladding at the end of the fiber can be present. During the polishing step of the method, if a cladding breakage is not prevented, the radiation patterns will not be adequate for communication and sensing applications.

Step 7 of the mechanical polishing method of the invention is the mounting of the optical fiber onto a glass slide. The freshly cleaved optical fiber, 303, is temporarily affixed onto glass slide 304. The end of the optical fiber is preferably allowed to extend about the width of the fiber cladding diameter beyond the edge of slide 304. The optical fiber cladding is preferably disposed flat on slide 304 by trimming any inner sheath, 302, so that it does not interfere with fiber 303 lying flat on glass slide 304. Fiber 303 is preferably disposed perpendicular to glass slide 304 to allow a symmetric flat polishing of the tip. Glass slide 304 is preferably glass so that the slide is of the same type of material as optical fiber 303. Dissimilar material might score or scratch the surface of the FODWWS. The angled end face of the FODWWS surface is preferably polished smooth to create an evanescent field.

Step 8 of the mechanical polishing method of the invention is to temporarily place the cleaved fiber onto a polishing block 308. This is done by inserting polishing block 308 into polishing frame 305; pushing the polishing block back until it is flush with foam pad 306 on polishing frame 305; and sliding glass slide 304 with the few mode fiber flush against foam pad 306 of the polishing frame.

Step 9 of the mechanical polishing method of the invention is to temporarily affix glass slide 309 onto the polishing block 308. This may be accomplished with either a temporary chemical adhesive or tape. It is important to ensure polishing block 308 and glass slide 309 are perpendicular to the few mode fiber extending just over the edge of the glass slide. As a optional test step, polishing block 308 may be removed from polishing frame 305, and glass slide 309 and polishing block 308 should not slip.

Step 10 of the mechanical polishing method of the invention is to replace polishing block 308 back into polishing frame 305. This steps of the method require at least one but preferably three levels of fiber optic polishing paper, course, medium and fine, in that order, be placed onto the foam pad 306. Polishing will generally, but not always, require course, medium and fine fiber optic polishing paper. For the initial shaping of the cylindrical wedge of the FODW, a course fiber optic polishing paper is generally be used. Next, the medium fiber optic is used. The final step is to polish the angled face of the FODWWS with a fine fiber optic polishing paper.

Step 11 of the mechanical polishing method of the invention is to polish the fiber by lightly moving polishing block 308 back and forth. The use of a course fiber optic polishing paper will cause the angled end face of the FODWWS to take on the angle θ of polishing frame 305. This may be any angle from 5 degrees to 89 degrees. The angle is dependent on the radiation pattern desired. For a radiated pattern that is radiated below and aft of the FODWWS, angles between 5 and 40 degrees are formed by the polishing. This range of angles will be cause semi-circle rings radiated back and below the cylindrical wedge to be formed. A radiated pattern just below the polished fiber will occur at an angle of 45 degrees. This is the optimum angle for de-multiplexing both the linearly polarized and standing wave modes of the dielectric waveguide. Polishing the angles beyond 60 degrees will create radiated circles. In order to create the linearly polarized modes as small arches, the surface of the polished wedge preferably comprises a reflective surface such as the reverse side or shiny side of the fiber optic polishing paper. By doing this the wedge will radiate both linearly polarized modes and standing wave modes.

Application of a fluid such as water may be used in the process of creating the FODWWS wedge. Water will remove polishing dust and keep the surface of the fiber cool. The frame 305 may comprise a gap between polishing block 308 and the foam pad 306, allowing water to drip onto the lower part of the frame and carry polishing debris with it.

The angle for polishing is dependent on the radiation pattern desired. Since the FODWWS wedge is also a radiating element, the reverse of the radiation can be achieved. By shaping the cylindrical wedge and then allowing an optical source such as a laser to focus energy into the bottom of the cylindrical wedge and striking the correct location on the surface of the wedge, an individual mode can be modulated. Adjusting a laser to modulate more than one mode will result in wave length division multiplexing.

Step 12 of the mechanical polishing method of the invention is the removing of polishing block 308 from polishing frame 305 and inspecting the FODWWS cylindrical wedge planar surface. This step may be repeated to ensure that angle θ is correct and that the fiber was not damaged in the manual polishing process. If the fiber was damaged, steps 1 through 12 may be repeated. If the polishing paper on foam polishing pad 306 is to be replaced, the process may be re-started at step 10 after the polishing paper is replaced.

Step 13 of the mechanical polishing method of the invention is the removal of temporarily affixed glass slide 309 and fiber 303 from the polishing block. This is done by removing the temporary glue or tape holding glass slide 309 onto polishing block 308.

Step 14 of the mechanical polishing method of the invention comprises removing fiber 303 from glass slide 309 and repositioning fiber 303 onto glass slide 309 for final polishing by removing the temporary glue or tape and lifting fiber 303 from glass slide 309. By allowing an optical source such as a laser to excite the input FODWWS cylindrical wedge, the radiation pattern can be observed. This allows easier positioning of fiber 303 back onto glass slide 309. Once the radiation pattern is clearly seen at the desired position, fiber 303 is placed back onto glass slide 309 as in step 7, allowing just enough fiber 303 to extend past the edge of glass slide 309 for fine polishing.

Step 15 of the mechanical polishing method of the invention requires that the FODWWS cylindrical wedge be fine polished. This step enables the radiated energy produce a clear pattern below the curved section of the FODWWS cylindrical wedge. Fine polishing is the adjustment of the cylindrical wedge to reflect energy from the bottom of the fiber to the surface of the FODWWS cylindrical wedge. Fine polishing on the permanent fixture is achieved in this particular embodiment by using fine polishing paper to polish the planar cylindrical wedge surface of the FODWWS. Polishing of the cylindrical wedge is best accomplished using figure-eight motions to ensure that a smooth and scratch-free surface is achieved on the planar cylindrical wedge surface of the FODWWS.

Step 16 of the mechanical polishing method of the invention is the step of ensuring the FODWWS fiber cylindrical wedge is radiating the semi circles, rings or linearly polarized mode(s) at the desired locations. Measuring the modulation of the modes is achieved by ensuring the modal arches are illuminating the appropriate linear array detectors of this invention.

Step 17 of the mechanical polishing method of the invention is placing the FODWWS cylindrical wedge onto a permanent fixture to meet the needs of the application.

The present invention is predicated in the formation of the fiber optic dielectric wave guide structure of an optical fiber with either 1) a receiving end, or 2) both the source and receiving end of a few mode fiber shaped into an FODWWS cylindrical wedge, as shown in FIG. 4. The mechanical polishing method of the invention is significantly easier to reproduce on a mass fabrication level than the chemical etched process of the prior art. the mechanical polishing process of the present invention will allow for the observation of the excitation source radiation from the bottom of the cylindrical wedge as it is being shaped. Linearly polarized and standing dielectric waveguide modes are created and controlled by the polishing process that will adjust and create an elliptical core/cladding and air interface. This interface of this invention establishes an evanescent field which both reflects the energy below the bottom of the fiber wedge and back to the source for standing wave guide modes. It is this electric and magnetic field behavior that allows for both modal multiplexing and de-multiplexing of this invention.

In the prior art, only the multimode fiber tip was shaped into a cone to allow modal radiation in the form of modal rings. The shape of the fiber end affects the radiation of energy from the fiber. In order to create a process that is friendly to mass production, the hydrofluoric acid used in previous work must be replaced by a more user friendly and environmentally friendly process. In an alternative embodiment of the method of producing the planar cylindrical wedge surface of the FODWWS of the invention, the optical fiber may be directly cleaved to the desired angle to produce the planar cylindrical wedge surface of the FODWWS at a desired angle θ to the longitudinal axis of the optical fiber. Cleaving the optical fiber to produce the planar cylindrical wedge surface of the FODWWS as desired achieves the same function as the mechanical process if angle θ can be achieved for the specific desired radiation pattern of modal energy. In this invention, the desired angle to be polished may be determined by computer aided design tools capable of simulating the electromagnetic standing and hybrid modes of the dielectric filled waveguide structure. The waveguide structure in this invention is preferably a step index few mode fiber, but may be graded index fiber, and maybe multimode or single mode fiber.

This invention embodies the modal multiplexing and de-multiplexing system of cylindrical dielectric waveguide or fiber optic waveguides with a cylindrical wedge mechanically polished on either or both ends of the few mode fiber. This invention is unique in that the system presented is predicated on the linearly polarized and standing waveguide modes established by the end cylindrical wedge shapes. This invention, unlike other work conducted in the field, does not simplify the linear polarized field equations to a set of four differential equations to model the modal multiplexing and de-multiplexing. This invention includes the z direction or axial field equations of the cylindrical waveguide structure. This is required based on the internal reflections of both the core cladding interface and the source and receiver axial ends of the few mode fiber. Linearly polarized modes are created by the very small difference between the core cladding indices. This small difference in indices allows for the existence of hybrid Electric Magnetic fields (EH) and the Magnetic Electric fields (EH) to propagate simultaneously. This allows for significant simplification of the linearly polarized fields to four field equations.

With the existence of standing waves which are created by the evanescent field reflectors of the cylindrical wedges mechanically polished on the surface of the fiber, the ends are now an elliptical core-cylindrical core interface. This interface which is also a core/cladding to air interface establishes an evanescent field. This evanescent field creates axial or z forested reflections that establish cylindrical waveguide standing waves and also radiates the fields from below the bottom of the cylindrical wedge. This radiation pattern is very different from the previous work of Murshid et al.

Modulation of established waveguide modes is achieved by first establishing a fundamental source laser field within the multiplexer/de-multiplexer fiber optic pigtail. Once the linearly polarized and standing wave modes are stabilized, a plural of laser sources that radiate into specific points of the source cylindrical wedge can affect the standing and linearly polarized fields. By controlling the amplitude of the allowed electric field or mode, amplitude modulation can be achieved. Shifting the pulsing period of two or more input lasers allows for phase modulation by the offset timing of pulsing energy. Frequency modulation can be achieved by changing the wavelength of the source laser.

Modal multiplexing and de-multiplexing of this invention is achieved by the modulation of allowed electric fields (modes) of the dielectric cylindrical waveguide. This invention can create the standing waves of both linearly polarized modes and standing wave modes by the source excitation laser coupled into a standard fiber optic connector such as the FIS connector. However, a source or input cylindrical wedge is required to create the selected modal modulation by the excitation sources. Exciting the perfectly cleaved 90° input face of a cylindrical dielectric wave guide with multiple laser sources will establish a significant number of hybrid electric and magnetic fields from the core/cladding interface. As Kerr et al. has demonstrated, this interface will create significant inter modal modulation as a result of the very small indices difference between the core and cladding material. The mode field diameter of the few mode fiber will act as filter to reduce the intermodal modulation that would make demodulation more difficult.

The cylindrical wedge which makes the modal multiplexer and de-multiplexer of the invention very effective should preferably be created reliably and with a high degree of repeatability. Previous work in the field has demonstrated the use of hydrofluoric acid as a means of etching fiber cones. This method leaves the very un-repeatable and no-reliability of the shaped fibers for mass production. The mechanical polishing process presented is an example of the polishing process which might be used. This process shapes the angle of the fiber consistently and with very little skill level in the art required. Using the system and method of the invention, the polishing technician is not subjected to the harsh and potentially lethal chemicals, such as hydrofluoric acid, to shape the fiber end. A traditional chemically-etched fiber end may also be extremely brittle; the mechanically polished cylindrical wedge is much more robust and durable. The system and method of the invention are ideal for mass production of the modal multiplexing and de-multiplexing fiber optic cylindrical wedge pigtail.

This invention claims the modal multiplexing and de-multiplexing of an optical fiber, which is operated at a wavelength that establishes a plurality of modes, may be achieved by a system of a plural of laser excitation sources, a few mode fiber with both ends of the modal multiplexing and de-multiplexing fiber optic polished to establish cylindrical wedges, and a linear array of a plural of laser detectors. This invention also establishes the modal multiplexing achieved by the cylindrical wedge. Any mechanical polishing process that does not change the material characteristics of permeability may be used to shape the optical fiber end into a cylindrical wedge. The most effective fine tuning of the radiated fields is achieved in this invention by simultaneously polishing the fiber and observing the radiated fields as radiated onto the linear array of detectors.

In the invention the key component is the FODWWS which is demonstrated in FIG. 4. Three fundamental parameters are considered for the modal source excitation and transmission into the detector array. The first is the angle at which the flat surface is polished. The second is the height of the unpolished lip at the end of the angled surface. The third parameter is the fiber optic core/cladding dimension.

A specific propagating mode may be obtained when the angle between the propagation vectors, or rays, and the fiber end face has a particular value. The propagation of specific modes is dependent upon the angle between the propagation vector, or rays of light, and the physical end face of the optical fiber. It is therefore an object of fiber-optic communication and sensor systems to efficiently and repeatedly create optical fiber interfaces with known and predictable characteristics that may be characterized as supporting specific modes, and may also be characterized as exhibiting specific behavior when propagating modes exit a fiber end face where there exists a fiber-to-air boundary.

Figure 8:
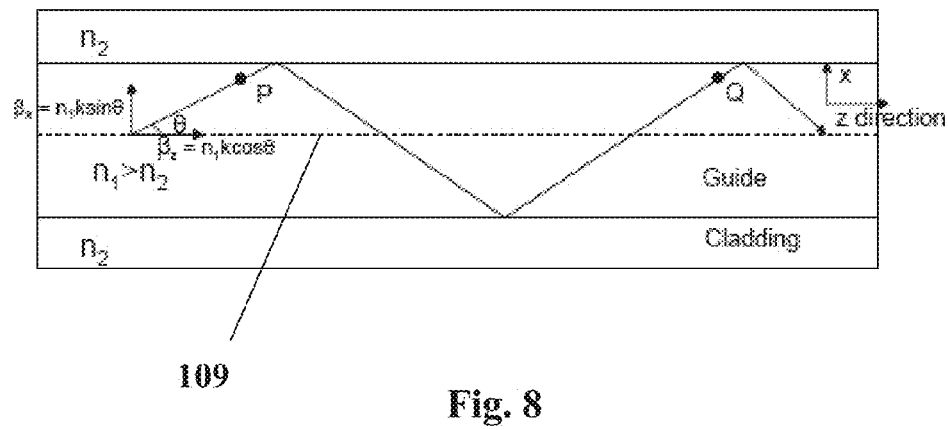
FIG. 8 depicts the longitudinal propagation of light energy propagating in a fiber.

Referring to FIG. 8, the behavior of light energy as it passes from a first medium having an index of refraction $n_1$ to a second medium having an index of refraction $n_2$ may be defined by Snell's law:

$$n_1 \sin(\theta_1) = n_2 \sin(\theta_2)$$

where:

$n_1$ is the refractive index of the medium the light is leaving;

$\theta_1$ is the incident angle between the light beam and the normal (normal is 90° to the interface between two materials);

$n_2$ is the refractive index of the material the light is entering; and $\theta_2$ is the refractive angle between the light ray and the normal.

When a light ray crosses an interface into a medium with a higher refractive index, it bends towards the normal. Conversely, light traveling cross an interface from a higher refractive index medium to a lower refractive index medium will bend away from the normal. At an angle known as the critical angle $\theta c$ light traveling from a higher refractive index medium to a lower refractive index medium will be refracted at 90°; in other words, refracted along the interface. If a ray of light hits the interface at any angle larger than this critical angle, it will not pass through to the second medium. Instead, it will be reflected back into the first medium, a process known as total internal reflection. The critical angle can be calculated from Snell's law, using an angle of 90° for the angle of the refracted ray $\theta 2$. For example, a ray emerging from glass with n1=1.5 into air (n2=1), the critical angle $\theta c$ is arcsin(1/1.5), or 41.8°.

For any angle of incidence larger than the critical angle, Snell's law will not be solved for the angle of refraction because the refracted angle would have a sine larger than 1, which is not possible. In that case all the light is totally reflected off the interface.

Still referring to FIG. 8, the longitudinal axis of the optical fiber is indicated as 109. It is known in the art that the outer surface of the optical fiber is typically cylindrical in shape and is disposed about longitudinal axis 109.

Figures 9A, 9B:
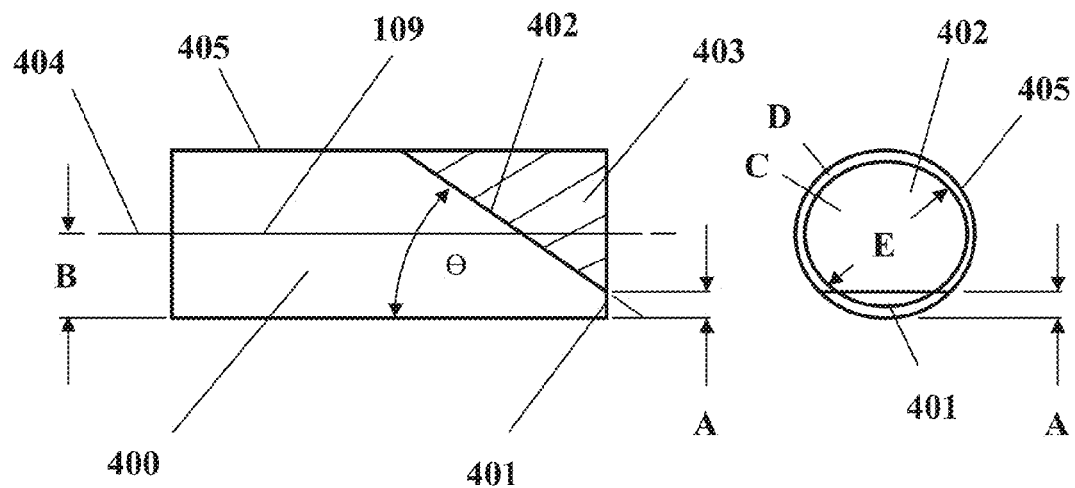
FIG. 9a depicts a side view of a preferred embodiment and best mode of the fiber optic dielectric waveguide structure (FODWWS), depicting the geometry of the FODWWS and showing the fiber material that is removed in the fabrication of the FODWWS.
FIG. 9b depicts an end view of a preferred embodiment and best mode of the fiber optic dielectric waveguide structure.

Referring now to FIGS. 9a and 9b, side view and end view, respectively, of a preferred embodiment of the fiber optic dielectric waveguide structure is depicted. This embodiment is a best mode of the invention. An optical fiber 400, typically comprising a core C comprising an outer core diameter E, and a cladding D disposed concentrically about cladding C of thickness F in which the core C and cladding D are of differing indices of refraction and supporting, in the best mode of the invention, a few propagating modes of light energy in optical fiber 400, is modified by removing from the optical fiber the volume 403 shown in cross hatch in FIG. 9a. Volume 403 may be removed from the optical fiber by any means known in the art such as cleaving or mechanical polishing. The best mode and preferred embodiment of the invention utilizes mechanical polishing to create surface 402, resulting in a polished planar surface 402 that is configured at an angle θ taken from the outer diameter of the optical fiber 105, which is typically the cladding. It can be seen that, as the outer diameter of the optical fiber is typically cylindrical about longitudinal axis 404, the angle between surface 402 and longitudinal axis 404 is θ as well. As the typical optical fiber comprises a core and a cladding surrounding the core, outer diameter 405 is, in the typical case, the outer diameter of the cladding. Angle θ may be any angle measure between 5 degrees and 90 degrees. The desired measure of θ may vary based upon the excitation source and whether it is desired to radiate standing wave modes or Linearly Polarized (LP) modes from the fiber optic dielectric waveguide structure.

Still referring to FIGS. 9a and 9b, a lip surface 401 is created by the removal of volume 403. Lip surface 401 may also be mechanically polished using any of the techniques known in the fiber optic art. Lip surface 401 may take the dimension A as is shown in FIGS. 9a and 9b. Dimension A is typically greater than the cladding thickness and is less than dimension B as shown in FIG. 9a, which is the distance between the longitudinal axis of the optical fiber and the outer diameter of the fiber 405 (which is typically the outer diameter of the cladding D). The lip surface 401 of dimension A is responsible in part for generating and determining which modes to the output.

Referring now to FIGS. 10a and 10b, a view of exemplary resulting standing wave and radiated linear polarized modes for a particular fiber optic dielectric waveguide structure are depicted.

The invention also comprises a method of manufacturing a dielectric waveguide structure having an angled planar surface and lip surface as shown, for example, as lip surface 101 in FIGS. 9a and 9b, which method may comprise the steps of:

a. Providing an optical fiber having a longitudinal axis, a core and a cladding, wherein said cladding is further defined as having a thickness;

b. Cleaving said optical fiber at a desired angle to the longitudinal axis of the fiber;

c. Creating a planar surface on said optical fiber by mechanically polishing said fiber at an angle α, wherein said angle α may take any measure between 5 degrees and 90 degrees, and leaving a lip surface that is not co-planer with said planar surface;

d. Mechanically polishing said lip surface.

Step a. of the method of the invention may further define the optical core and cladding as being concentric about a longitudinal axis of the optical fiber.

Step b. of the method of the invention may further define the optical fiber as supporting a few modes, or may be step or graded index fiber, or may be single or multi-mode fiber, or any combination of these.

Step c. of the method of the invention may further define the planar surface as being adapted to transmit linear polarized and standing wave modes of optical energy from the fiber into free space.

Step d. of the method of the invention may further define the lip surface as being perpendicular to the longitudinal axis, and of a dimension that is much greater than the cladding thickness.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

What is claimed is:

1. A fiber optic dielectric waveguide structure comprising:
   an optical fiber having a longitudinal axis, said optical fiber comprising a first end a second end, a core, and a cladding;
   wherein said core and said cladding are cylindrically shaped and coaxially disposed along said longitudinal axis, and wherein said core is defined as having a first index of refraction and said cladding is defined as having a second index of refraction, and wherein said core is further defined by a cross section having a radius, and wherein said cladding is further defined as being concentrically disposed about said core and having a cross section defined as a ring having an inner cladding radius and an outer cladding radius, said cladding thickness being defined as the difference between said inner cladding radius and an outer cladding radius; and
   wherein at least one of said first end or said second end further comprise a truncated cylindrical wedge structure, said truncated wedge structure comprising a first planar surface disposed at an angle to said longitudinal axis of said fiber forming a cylindrical wedge, and said truncated wedge structure further comprising a second planar surface perpendicular to said longitudinal axis, said second planar surface truncating said cylindrical wedge and said second planar surface forming a lip of said cylindrical wedge, said lip having a height; and
   wherein said wedge structure is disposed to reflect standing wave modes from said first planar surface, said standing wave modes spatially separated as concentric rings so as to be individually detectable, and wherein said wedge structure is disposed to radiate linearly polarized modes, said linearly polarized modes spatially separated and radiating outward from the truncated cylindrical wedge structure so as to be individually detectable, and
   wherein said angle is determined based upon a desired radiation pattern associated with one of the standing wave modes and the linearly polarized modes.

2. The fiber optic dielectric waveguide structure of claim 1, wherein said angle is greater than five degrees and less than or equal to eighty-nine degrees.

3. The fiber optic dielectric waveguide structure of claim 1, wherein said second planar surface lip height is greater than said cladding thickness.

4. The fiber optic dielectric waveguide structure of claim 1, wherein said fiber is a few mode fiber.

5. The fiber optic dielectric waveguide structure of claim 3, wherein said fiber is a few mode fiber.

6. The fiber optic dielectric waveguide structure of claim 1, wherein said fiber is a multi-mode fiber.

7. The fiber optic dielectric waveguide structure of claim 3, wherein said fiber is a multi-mode fiber.

8. An optical modal multiplexed fiber optic system, comprising:
   at least one optical source;
   at least one photodetector;
   an optical fiber having a longitudinal axis, said optical fiber comprising a first end a second end, a core, and a cladding;
   wherein said core and said cladding are cylindrically shaped and coaxially disposed along said longitudinal axis, and wherein said core is defined as having a first index of refraction and said cladding is defined as having a second index of refraction, and wherein said core is further defined by a cross section having a radius, and wherein said cladding is further defined as being concentrically disposed about said core and having a cross section defined as a ring having an inner cladding radius and an outer cladding radius, said cladding thickness being defined as the difference between said inner cladding radius and an outer cladding radius; and
   wherein said first end and said second end further comprise a truncated cylindrical wedge structure, said truncated wedge structure comprising a first planar surface disposed at an angle to said longitudinal axis of said fiber forming a cylindrical wedge, and said truncated wedge structure further comprising a second planar surface perpendicular to said longitudinal axis, said second planar surface truncating said cylindrical wedge and said second planar surface forming a lip of said cylindrical wedge, said lip having a height; and
   wherein said at least one source is in optical communication with said first end of said optical fiber and is disposed to excite either a standing wave mode or linearly polarized mode in said optical fiber; and
   wherein said at least one photodetector is in optical communication with said second end of said optical fiber and is disposed to receive either a radiated standing wave or radiated linearly polarized wave radiated by said second end of said optical fiber; and
   wherein said angle is determined based upon a desired radiation pattern associated with one of the standing wave and the linearly polarized wave.

9. The optical modal multiplexed fiber optic system of claim 8, wherein said at least one optical source is a laser.

10. The optical modal multiplexed fiber optic system of claim 9, wherein said at least one optical source is further defined as a plurality of optical sources, each optical source disposed to excite an independent standing wave mode or linearly polarized mode in said optical fiber; and wherein said at least one photodetector is further defined as a plurality of photodetectors, each photodetector disposed to receive one of said independent standing wave modes or linearly polarized modes radiated from said second end of said fiber, said plurality of optical sources and plurality of photodetectors forming independent optical communication channels, one independent communication channel for each optical source and photodetector pair.

11. The fiber optic dielectric waveguide structure of claim 1, wherein said angle is greater than five degrees and less than or equal to eighty-nine degrees.

12. The fiber optic dielectric waveguide structure of claim 8, wherein said second planar surface lip height is greater than said cladding thickness.

13. The fiber optic dielectric waveguide structure of claim 8, wherein said fiber is a few mode fiber.

14. The fiber optic dielectric waveguide structure of claim 9, wherein said fiber is a few mode fiber.

15. The fiber optic dielectric waveguide structure of claim 10, wherein said fiber is a few mode fiber.

16. The fiber optic dielectric waveguide structure of claim 12, wherein said fiber is a few mode fiber.

17. The fiber optic dielectric waveguide structure of claim 8, wherein said fiber is a multi-mode fiber.

18. The fiber optic dielectric waveguide structure of claim 9, wherein said fiber is a multi-mode fiber.

19. The fiber optic dielectric waveguide structure of claim 10, wherein said fiber is a multi-mode fiber.

20. The fiber optic dielectric waveguide structure of claim 12, wherein said fiber is a multi-mode fiber.

21. A method for fabricating a dielectric waveguide structure, said method comprising:
providing an optical fiber having a longitudinal axis, an optical core and a cladding, wherein said cladding is concentrically disposed about said optical core, and wherein said cladding is further defined as having a thickness;
cleaving said optical fiber at a desired angle to the longitudinal axis of the fiber to create a fiber end face;
creating a planar surface on said optical fiber end face by mechanically polishing said fiber at an angle to said longitudinal axis of said optical fiber, wherein said angle may take any measure greater than 5 degrees and less than or equal to 89 degrees, and polishing said fiber at said angle until a truncated cylindrical wedge is formed having a lip surface that is perpendicular to said longitudinal axis, said lip having a height;
wherein said angle is determined based upon a desired radiation pattern associated with one of a standing wave mode and a linearly polarized wave mode.

22. The method of claim 21, wherein said step of polishing is continued until said height of said lip reaches a predetermined value.

23. The method of claim 22, wherein said predetermined value of said height is greater than said cladding thickness.

24. The fiber optic dielectric waveguide structure of claim 1, wherein the angle is selected to be 45 degrees to effect de-multiplexing of both the standing wave mode and the linearly polarized mode.

25. The fiber optic dielectric waveguide structure of claim 8, wherein the angle is selected to be 45 degrees to effect de-multiplexing of both the standing wave mode and the linearly polarized mode.

* * * * *